Dec. 15, 1931. L. C. LARSEN 1,836,806
TOWING DEVICE
Filed April 16, 1930

Inventor
Ludvig C. Larsen
By his Attorneys
Williamson Reif & Williamson

Patented Dec. 15, 1931

1,836,806

UNITED STATES PATENT OFFICE

LUDVIG C. LARSEN, OF CHOKIO, MINNESOTA

TOWING DEVICE

Application filed April 16, 1930. Serial No. 444,713.

This invention relates to towing devices for vehicles and particularly to devices whereby an incapacitated automobile may be drawn or pushed to some suitable point for repairs.

It is an object of my invention to provide a simple, comparatively inexpensive towing device, which may be folded into a compact bundle and conveniently carried in the back seat of an automobile and which may be quickly set up and attached to a pair of vehicles for pulling or pushing one of said vehicles from the other.

It is another object to provide such a towing device which will afford a relatively stiff, inflexible connection between the cars to prevent the cars from striking each other in the towing operation and to prevent sharp jerks and strains on the connection.

Another object is to provide a device of the class described, which may be quickly and positively connected with various accessible parts at the forward or rear ends of motor vehicles, and which, while affording a substantially inflexible connection to constantly space the towing and towed vehicle a predetermined distance apart, affords a swivel action in the connection to relieve the device and the parts to which the device is attached from torsional strain due to irregularities in the surface of the road over which the vehicles are traveling.

Still another object is to provide in a device of the class described, highly efficient means for adjustably and tightly securing the ends of the tow device to various parts of the towing and towed vehicle.

Figure 1:
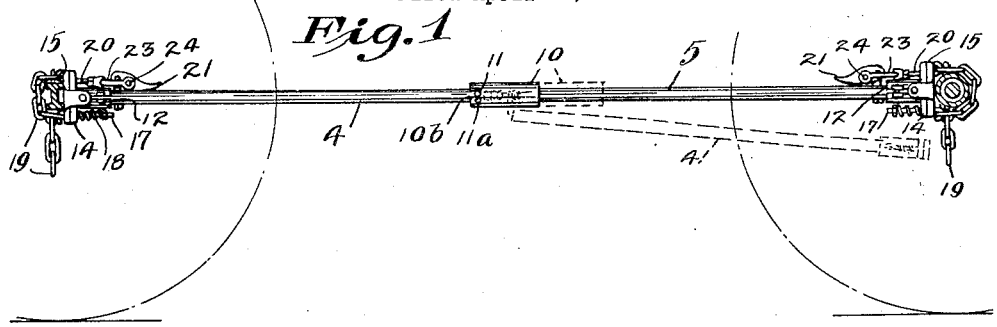
Figure 2:
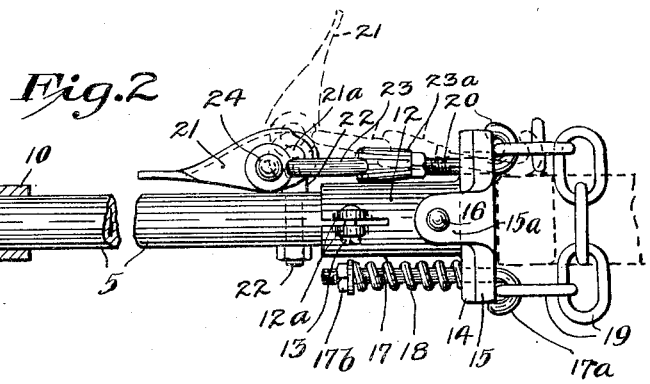
Figure 3:
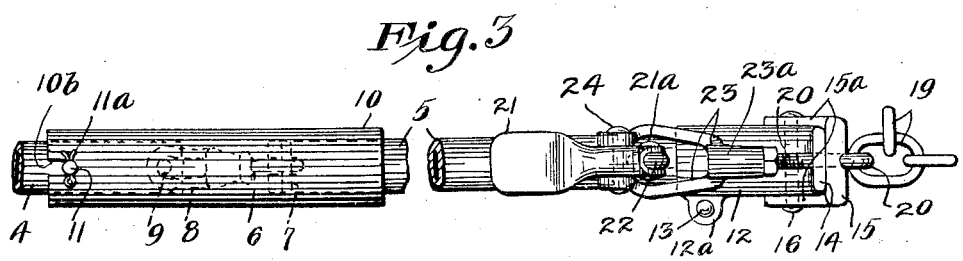

These and other objects and advantages of the invention will be fully set forth in the following description made in connection with the accompanying drawings wherein like reference characters refer to similar parts throughout the several views and wherein, Fig. 1 is a side elevation showing diagrammatically my towing device operatively connected to a pair of vehicles for towing, certain of the dotted lines indicating the folded or compact position of the towing sections;

Fig. 2 is a view mostly in top plan, some parts being broken away to show the swivel connection between the tow sections and the retaining means for the sleeve, the right hand tow head being applied and connected somewhat differently than in Fig. 1, to facilitate attachment to a shackle or spring of a motor vehicle; and Fig. 3 is a side elevation of my device applied in the manner shown in Fig. 2.

The embodiment of the invention illustrated comprises a pair of towing sections 4 and 5, which may be in the form of tubular bars having a hinge or loose connection between the inner ends thereof, which includes a swivel. As illustrated, this connection comprises an eye bolt 6 loosely pivoted to a diametrically extending pin 7 secured in the inner end of towing section 5. Eye bolt 6, as shown, has a frusto-conical shank 6a which is swivelly connected with a complementary-shaped seat 8a carried by a loop member 8. Loop member 8 is loosely and pivotally connected with a diametrically extending bolt 9 secured to the inner end of tubular section 4. Slots 7a and 9a are provided in the ends of towing sections 5 and 4 respectively to permit swinging of the connection members 6 and 8.

A connector sleeve 10 telescoped over one of the towing sections is adapted to receive the connected inner ends of sections 4 and 5 when the same are positioned in longitudinal alinement and hold said sections against relative swinging movement. As shown, when the device is folded in compact form, sleeve 10 is carried by the right hand section 5 and may be projected over the inner end of member 4 and locked in operative position by suitable means, such as a spring pressed pin 11 extending diametrically through the inner end of tubular section 4. Pin 11 may be provided with a cotter pin 11a to prevent displacement thereof from section 4 and has an enlarged engagement head at the opposite end thereof, which interlocks with an aperture 10a formed adjacent the left hand end of sleeve 10. Slot 10b, extending inwardly from the left hand end of sleeve 10, is adapted to accommodate the opposite projecting end of pin 11.

An attachment or towing head is provided at the outer end of each of the sections 4 and 5, and inasmuch as said heads and their associated attachment mechanisms are identical for both sections the parts thereof will be numbered with similar reference characters. As shown, each of said attachment heads comprises a clamping sleeve 12, which surrounds the outer end of one of the sections and, as shown, has a slit inner end provided with clamping ears 12a through which a clamping bolt 13 projects. Sleeve 12 carries at its outer end, a flat plate 14 rigidly connected or integrally formed therewith and of considerably large area than the diameter of said sleeve and to plate 14 is secured an abutment pad 15, which may be constructed of live rubber or other suitable non-abrasive material. The pad 15 may have inturned ears 15a, which are secured to sleeve 12 by means of a diametrically disposed bolt 16 passing through said sleeve and, as shown, also through the outer end of the tubular section to which the attachment head is secured. A hook bolt 17 is projected through an aperture in one of the overhanging portions of the plate 14 and extends parallel with the axis of the towing section, with its hook 17a disposed outwardly of and engaging the abutment pad 15, but yieldingly held in said position by means of a compression spring 18 surrounding the bolt and interposed between the inner shoulder of plate 14 and a nut 17b threadedly engaging the inner end of the bolt.

One end of a chain or other suitable flexible member 19 is secured to the hook 17 and the chain is wrapped around a member to which the device is to be attached, such as an axle, spring or bar conveniently located on the front or rear of a motor vehicle and a hook bolt 20 which projects through the plate 14 at the opposite end thereof from the hook bolt 17 is adapted to engage one of the links of chain 19 and has its shank connected with a draw clamp to tighten the chain and securely clamp it about the attachment member of the motor vehicle. My draw clamp illustrated, comprises an eccentric arm 21, which may be pivoted by a pin 21a to an eye bolt 22, which extends diametrically through the tubular section adjacent the sleeve 12. The threaded shank of hook bolt 20 is adjustably connected with a socket 23a of a yoke member 23, the arms of which are pivoted to and eccentrically connected with arm 21 by means of a pin or bolt 24. By swinging the eccentric arm 21 from the position shown in dotted lines in Fig. 2 to the position shown in full lines, it will be obvious that the hook bolt 20 will be drawn inwardly, tightening the pin 19 and drawing the hook tightly against the abutment pad 15 to prevent disengagement between the hook and chain.

Operation

When not in use, the connector sleeve 10 is disengaged from locking pin 11 of section 4 and is moved to the medial portion of tubular section 5. The two sections 4 and 5 are then folded together into a compact bundle with the attachment heads abutting and the device may be conveniently carried beneath the seat of a motor vehicle.

To utilize the device, the sections 4 and 5 are swung out into longitudinal alinement and the connector sleeve 10 is then projected to receive the inner end of tubular section 4 and interlocked with the pin 11. It will be noticed that the slot 10b must be properly alined with the smaller end of pin 11 before the parts may be interlocked. One of the attachment heads is then quickly clamped to a convenient member on the car to be towed, such as an axle, spring, shackle or bumper and this may be easily accomplished by releasing eccentric arm 21, wrapping the chain or flexible member 19 about the member and engaging the proper link of the chain with the hook of hook bolt 20 and then tightening the chain and clamping the same by swinging the eccentric arm 21 inwardly against the tubular section. Regardless of whether it is desired to attach the device to a horizontal, vertical or inclined member, since the tubular sections 4 and 5 are swiveled together at their inner ends, as well as hingedly connected, the attachment head may always be positioned to enable the chain to properly surround the desired member on the vehicle. The towed vehicle is then moved into proper spaced relation with the connected end of the vehicle to be towed and the attachment head on the opposite end of the device is secured to an appropriate member of the second vehicle in the manner previously described. If one of the attachment heads need to be angled with respect to the other clamping head, this is easily accomplished by twisting one of the tubular sections on its swivel connection.

With my device operatively connected, a stiff coupling is provided which will always maintain the connected ends of two vehicles at a predetermined distance apart, although, due to the swivel connection between the sections 4 and 5, the torsional strain on the sections, the attachment heads and the members of the vehicles to which the heads are attached will be eliminated when the vehicles are traveling over uneven road surfaces.

The inflexibility of my towing device prevents excessive strains and jerks on the parts, since there can be no slack in the coupling, as in the case where a flexible tow cable is utilized. Since the chains 19 are yieldingly connected at their ends through the hook bolts 17 and compression springs 18, strains and slight jerks will be cushioned to prevent damage to the parts and in turning corners the chains will yield slightly to enable the sections to swing relatively to the members of the motor vehicles to which they are secured.

From the foregoing description it will be seen that I have provided a simple, comparatively inexpensive towing device having high efficiency, adapted to be folded into a compact bundle and capable of being quickly set up for use and easily and securely attached to various parts of the motor vehicle.

It will, of course, be understood that various changes may be made in the form, details, arrangement and proportions of the parts, without departing from the scope of my invention, which, generally stated, consists in a device capable of carrying out the objects above set forth, in the novel parts and combinations of parts disclosed and defined in the appended claims.

What is claimed is:

1. A towing device for vehicles, comprising a pair of bars, a hinge connection between the inner ends of said bars to enable said bars to be folded together into a compact bundle, a sleeve slidably connected with one of said bars and adapted to surround the connected ends of both of said bars when said bars are longitudinally alined, means for locking said sleeve in said position, towing heads on the outer ends of said bars, and fastening devices associated with said towing heads.

2. A towing device for vehicles, comprising a pair of elongated bars, a hinge connection between the inner ends of said bars, said connection having a swivel therein, means for engaging the connected ends of said bars to retain said bars in substantially longitudinal alinement with freedom for swiveling on their longitudinal axes, and towing and attachment heads connected with the outer ends of said bars.

3. A towing device comprising a pair of rigid bars having inner ends of circular cross section, a hinge connection between the inner ends of said bars, a sleeve slidably connected with one of said bars and adapted to surround the connected ends of both of said bars and to house said hinge connection, a spring pressed pin for locking said sleeve in said position, and towing heads on the outer ends of said bars having attachment means associated therewith.

4. A towing device for vehicles comprising a pair of bars, a swivel connection between the inner ends of said bars, means for maintaining said bars in substantially axial alignment with freedom for swivelling movement, towing heads at the outer ends of said bars, a clamping device mounted on each towing head, each clamping device comprising a flexible member secured at one end to a towing head and an eccentric clamp secured to the bar connectable at different points with said flexible member whereby independent clamping attachment of each towing head may be effected.

5. A towing device for vehicles comprising a substantially rigid elongated towing or thrust element having towing heads at the ends thereof, independent clamping devices, one associated with each of said towing heads, each clamping device comprising a flexible element adapted to be wrapped around a member to which the device is to be connected, one end of said flexible element being yieldingly connected with a towing head and a draw clamp associated with said towing head and being adapted to engage the bight of said flexible element at different points.

In testimony whereof I affix my signature.

LUDVIG C. LARSEN.